(12) United States Patent
Shemwell (10) Patent No.: US 11,603,217 B2
(45) Date of Patent: Mar. 14, 2023

(54) COMPACT PORTABLE/FIXED AIRFIELD LIGHT

(71) Applicant: LASER GUIDANCE, INC., Redmond, WA (US)

(72) Inventor: David Mark Shemwell, Redmond, WA (US)

(73) Assignee: LASER GUIDANCE, INC., Redmond, WA (US)

( * ) Notice: Subject to any disclaimer, the term of this patent is extended or adjusted under 35 U.S.C. 154(b) by 48 days.

(21) Appl. No.: 16/969,943

(22) PCT Filed: Feb. 11, 2019

(86) PCT No.: PCT/US2019/017544
§ 371 (c)(1),
(2) Date: Aug. 13, 2020

(87) PCT Pub. No.: WO2019/160821
PCT Pub. Date: Aug. 22, 2019

(65) Prior Publication Data
US 2021/0070469 A1 Mar. 11, 2021

Related U.S. Application Data

(60) Provisional application No. 62/630,164, filed on Feb. 13, 2018.

(51) Int. Cl.
*B64F 1/20* (2006.01)
*B64D 47/02* (2006.01)
(Continued)

(52) U.S. Cl.
CPC ............... *B64F 1/20* (2013.01); *B64D 47/02* (2013.01); *F21S 9/02* (2013.01); *F21V 7/041* (2013.01);
(Continued)

(58) Field of Classification Search
CPC ............ B64D 2203/00; F21W 2111/06; F21Y 2115/10
See application file for complete search history.

(56) References Cited

U.S. PATENT DOCUMENTS

| 4,201,973 A * | 5/1980 | Jackson | G08G 5/025 73/170.08 |
| 5,669,691 A | 9/1997 | Barrow | |

(Continued)

FOREIGN PATENT DOCUMENTS

JP 2013077488 A * 4/2013

OTHER PUBLICATIONS

International Search Report dated Apr. 24, 2019, for PCT/US2019/017544, filed Feb. 11, 2019.
(Continued)

*Primary Examiner* — Anh Q Tran
(74) *Attorney, Agent, or Firm* — AEON Law, PLLC; Adam L. K. Philipp; Jonathan E. Olson (57) ABSTRACT

The invention relates to an airfield light comprising a body, a medium intensity lighting arrangement, and a high intensity lighting arrangement. The medium intensity lighting arrangement provides an omnidirectional light source, and the high intensity lighting arrangement provides a unidirectional or bidirectional light source. The invention is energy efficient compared to conventional airfield lights, and has particular application to temporary airfields. LEDs may be used as the light sources.

20 Claims, 5 Drawing Sheets

(51) Int. Cl.

| | |
|---|---|
| *F21S 9/02* | (2006.01) |
| *F21V 7/04* | (2006.01) |
| *H05B 45/10* | (2020.01) |
| *H05B 47/17* | (2020.01) |
| *H05B 47/19* | (2020.01) |
| *F21Y 115/10* | (2016.01) |
| *F21W 111/06* | (2006.01) |

(52) U.S. Cl.
CPC ............. *H05B 45/10* (2020.01); *H05B 47/17* (2020.01); *H05B 47/19* (2020.01); *B64D 2203/00* (2013.01); *F21W 2111/06* (2013.01); *F21Y 2115/10* (2016.08)

(56) References Cited

U.S. PATENT DOCUMENTS

| | | |
|---|---|---|
| 7,088,263 B1 | 8/2006 | Krause et al. |
| 2007/0013557 A1* | 1/2007 | Wang ................ H05B 45/30 340/945 |
| 2013/0094192 A1 | 4/2013 | De Boeck et al. |

OTHER PUBLICATIONS

International Preliminary Report on Patentability, PCT/US2019/017544, dated Aug. 18, 2020.
Rossier_Robert_Light Up Your Night_ A Guide to Airport Lighting Systems AOPA_Dec. 1998.
Written Opinion of the International Searching Authority, PCT/US2019-017544, dated Apr. 24, 2019.

\* cited by examiner

COMPACT PORTABLE/FIXED AIRFIELD LIGHT

FIELD

The invention relates to airfield lighting, which may be either portable or fixed. For convenience, the present invention will be described with particular reference to portable lighting for temporary airfields.

BACKGROUND

Airfield lighting systems are used to direct planes during landing, take-off and taxiing. Pilots rely on these lights for guidance, especially during times of low visibility, to identify airfield features such as runways and taxiways. Without functioning airfield lights, there can be disastrous consequences—for example, a plane may miss a runway or be unable to land or take off.

Conventional airfield lights use halogen lamps, which are very energy inefficient. In permanent airfields, this can result in increased energy costs, or in a worst case scenario, the failure of a power supply may make a runway unusable. For a temporary airfield, the problem is magnified, because temporary airfields often operate with limited power and/or do not have backup generators.

It would be desirable to provide an airfield light which is more energy efficient, or at least provides an alternative to existing airfield lights. It is known to practitioners skilled in the arts that Light Emitting Diodes can greatly reduce energy consumption in airfield lighting. To date the primary approach to using LED light sources is to simply replace the conventional light emitter with LED's, while this improves the efficiency of the airfield light, the results are still not optimal. This invention provide an optimization of the electrical efficiency of LED airfield lights which is no achievable by the primary approach.

SUMMARY

In a first aspect of the invention, there is provided an airfield light comprising:
a body;
a first lighting arrangement, having a first intensity with an omnidirectional optical system;
a second lighting arrangement which is substantially unidirectional, having a second intensity that is higher than the first intensity.

The airfield light may include a third lighting arrangement which is similar to the second, but pointing in a substantially opposite direction.

As used herein, two quantities are "substantially" equal if they differ by less than 20%. And two entities are "substantially" aligned if they align within 20 degrees. In these and other respects, "substantial" generally means "nominal" as used herein.

The first lighting arrangement is preferably an intensity that would be known to practitioners of the art as a medium intensity airfield light. The first lighting arrangement is preferably an omnidirectional lighting arrangement, and may comprise one or more LEDs directed at a cone reflector.

The second lighting arrangement is preferably of an intensity known to practitioners of the art as a high intensity airfield light. The second lighting arrangement may be a unidirectional lighting arrangement or a bidirectional lighting arrangement, comprising one or more LEDs. The LEDs may be housed in a vertical light housing, with an open side or sides such that the LEDs can shine out the open side(s). The third lighting arrangement is similar to the second but illuminates in the opposite direction.

Preferred embodiments of the present invention therefore provide numerous advantages over conventional airfield lights. It enables a single light to provide both medium and high intensity lighting functions—which may be omnidirectional (medium intensity) or unidirectional (high intensity). The use of a unidirectional lighting in the second and third lighting arrangements provides high intensity light in either direction or which only one of the arrangement is required to be turned on. This means that the light of the present invention may be positioned on an airfield to shine in only the desired direction(s)—resulting in significant energy savings. These energy saving features are particularly important for lights used on temporary airfields. In addition, the use of a single light for both medium and high intensity lighting requirements means that the set up of a temporary airfield is simpler.

The airfield light may further comprise a receiver to receive control signals to adjust a setting of the airfield light. The receiver may be wired or wireless.

The control signals may selectively turn on or off the first and second lighting arrangements, or may specify patterns (e.g. flashing patterns), depending on the information to be transmitted by the light.

The body may comprise a substantially flat base, a light housing and/or a battery housing. The light housing may comprise a cone reflector, to reflect light from the first lighting arrangement omnidirectionally, and an open side or sides such that the second lighting arrangement may be directed out the open side. LEDs making up the second lighting arrangement may be aligned vertically within the light housing.

The light housing may be movable between an operative state and a transport state. Preferably, the light housing is foldable (or pivotable) between these states—wherein in the operative state, the light housing is substantially vertical, and in the transport state, the light housing is substantially horizontal.

The battery housing can house a battery to power the light—either as a primary power source, or preferably as a backup power source. The light preferably operates on an AC power source, with the battery as a backup in case the primary power source goes down. The use of a battery backup for an airfield light is considered to be a substantial improvement over conventional airfield lights.

In a second aspect of the invention, there is provided an airfield lighting system including multiple airfield lights according to any one of the preceding claims, wherein the lights are arranged on an airfield.

The lights may be individually controlled and/or powered, or may be controlled and/or powered collectively.

A detailed description of one or more embodiments of the invention is provided below, along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

BRIEF DESCRIPTION OF THE DRAWINGS

Embodiments of the invention will now be described with reference to the accompanying drawings wherein.

DETAILED DESCRIPTION

Referring to the figures, there is shown an airfield light 100 comprising a flat-based body 110, to sit firmly on the ground when the light 100 is installed. The body includes a light housing 120 and battery housing 130.

Figure 1:
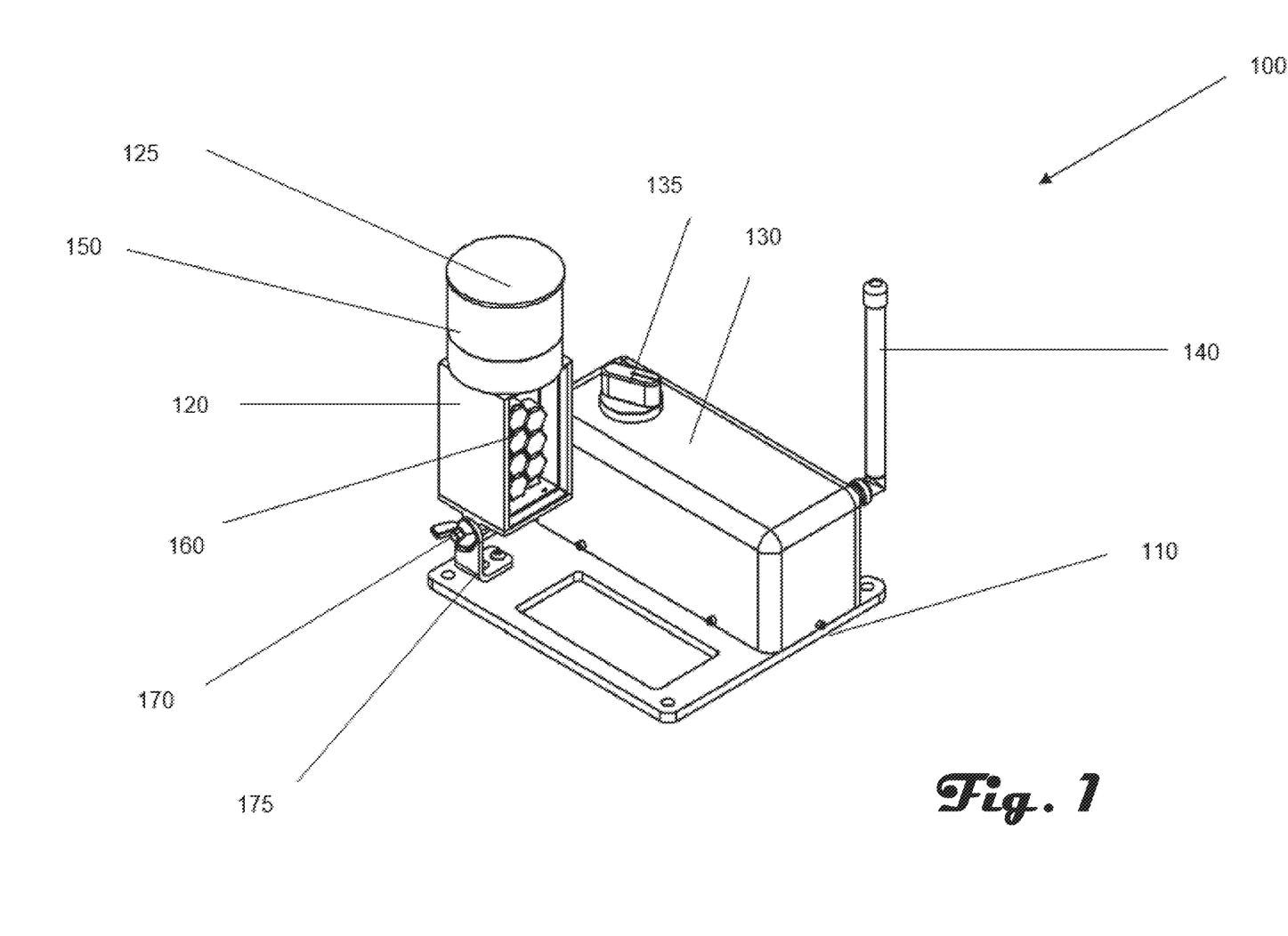
FIG. 1 is a perspective view of an airfield light according to an embodiment of the present invention, in an operative state.
Figure 2:
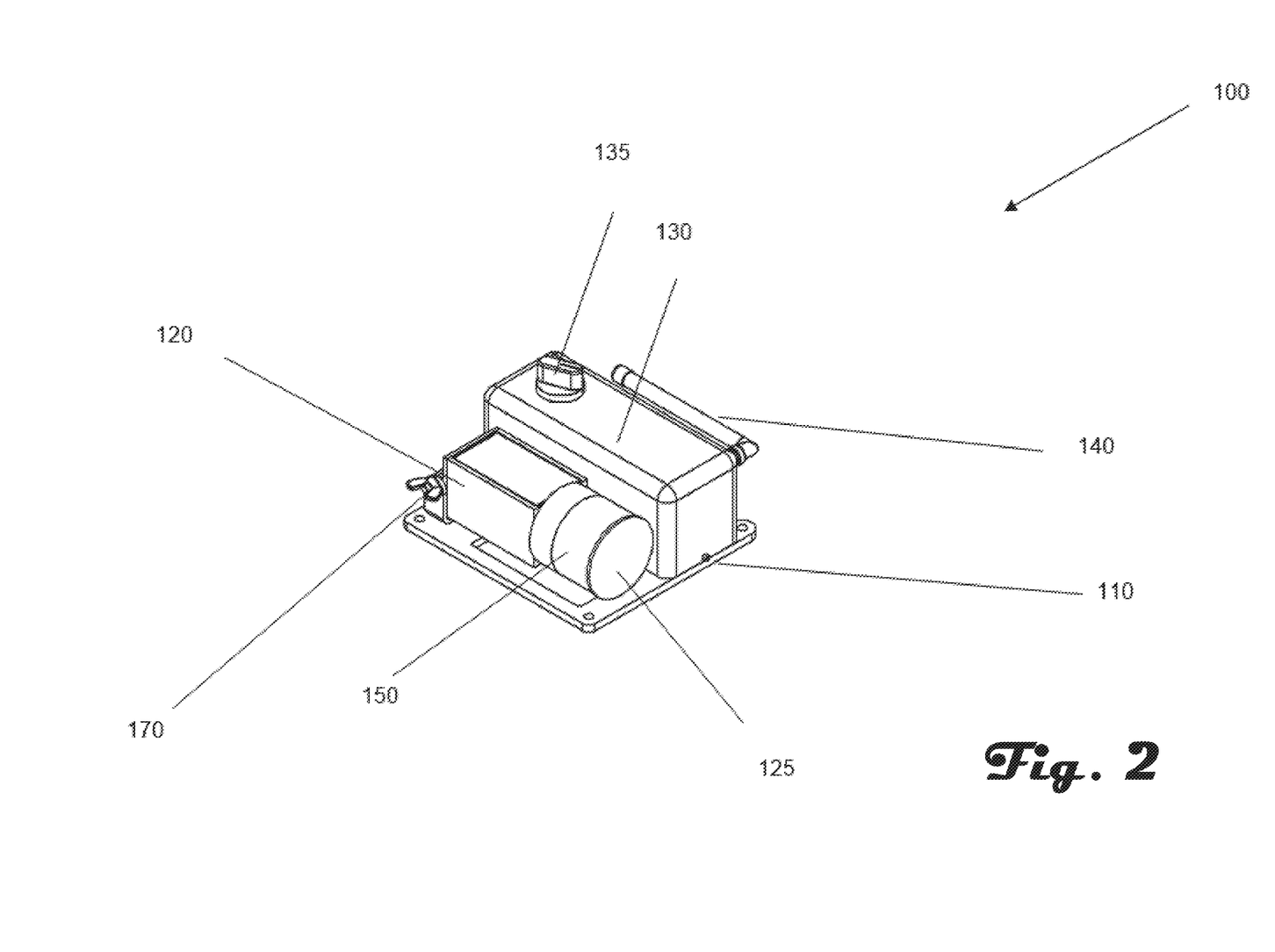
FIG. 2 is a perspective view of the light of FIG. 1, in a transport (ie non-operative) state.
Figure 3:
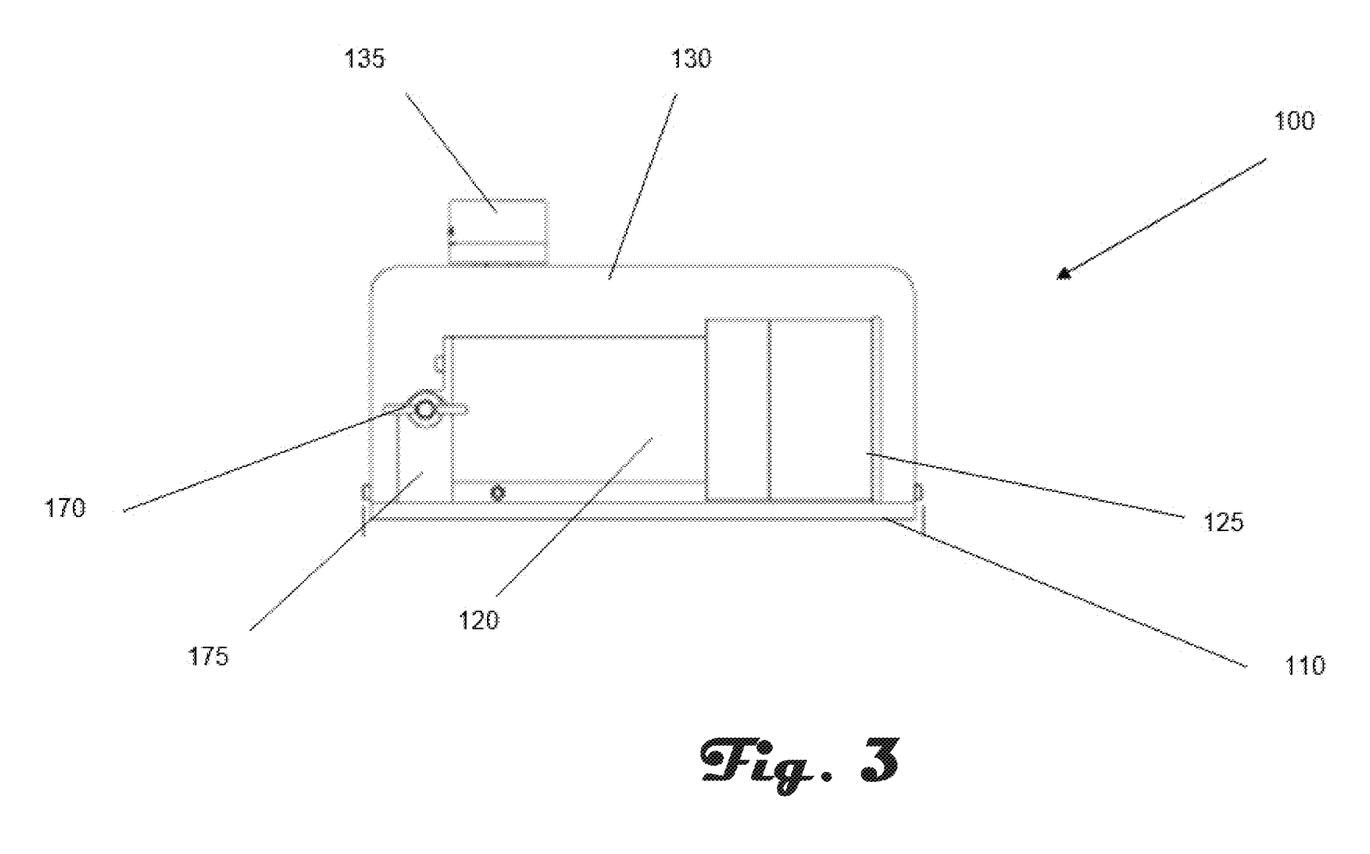
FIG. 3 is a side view of the light of FIG. 1, in a transport (ie non-operative) state.
Figure 4:
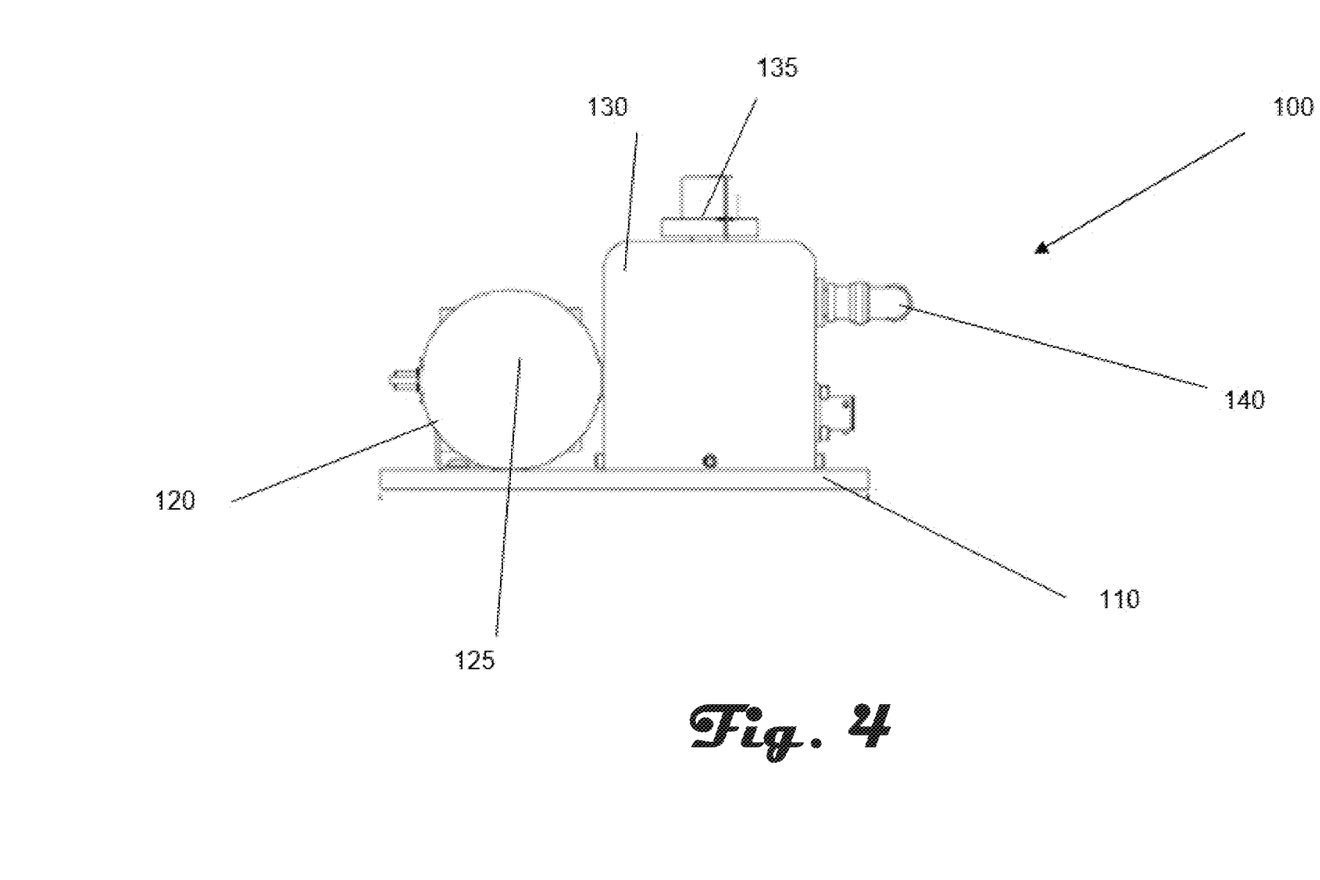
FIG. 4 is an end view of the light of FIG. 1, in a transport (ie non-operative) state.

The light housing 120 houses two lighting arrangements—a first, medium intensity lighting arrangement 150 and a second, high intensity lighting arrangement 160. The entire light housing 120 is installed on a bolt and wing nut arrangement 170, passing through a pivot mount 175, such that it can be moved between an operative state (as shown in FIG. 1) and a non-operative or transport state (as shown in FIGS. 2 to 4). The wing nut can be tightened or loosened on the bolt to allow the light housing 120 to be respectively secured in a desired position, or moved between positions. In this embodiment, the light housing 120 folds or pivots about the bolt, to move the housing 120 between substantially vertical and substantially horizontal positions.

The medium intensity lighting arrangement 150 includes a medium intensity LED [typically 125 candela], which is located within the light housing 120 and directed upwardly onto a cone reflector 125. The light housing 120 includes a transparent section (e.g. formed of glass, Perspex or other transparent material) which allows light from the medium intensity lighting arrangement 150 to be directed in all directions, off of cone reflector 125.

Figure 5:
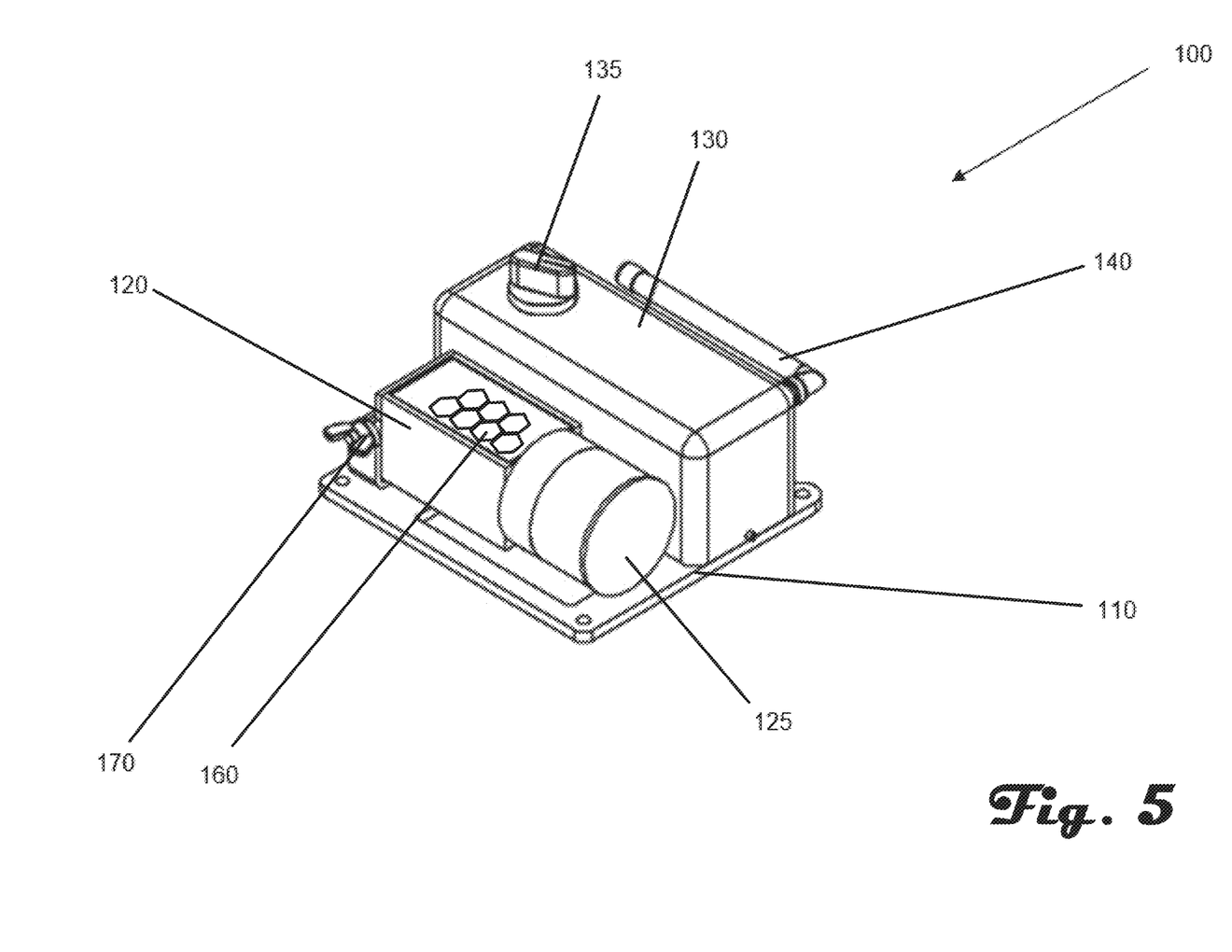
FIG. 5 is a perspective view of an airfield light according to an embodiment of the present invention, in a transport state.

The high intensity lighting arrangement 160 includes a bank of high intensity LEDs [typically up to 10,000 candela], and may include two banks of high intensity LEDs as in the embodiment of FIG. 5. In these embodiment, each bank includes seven LEDs. In the embodiment of FIGS. 1 to 4, the housing 120 is open on one side, allowing the bank of high intensity LEDs to shine out that side. In the embodiment of FIG. 5, the housing 120 is open on opposed sides, allowing the respective banks of high intensity LEDs 160 to shine out these open sides. The high intensity lighting arrangement(s) 160 are therefore a unidirectional or bidirectional arrangement, not an omnidirectional arrangement. In general, high intensity airfield lights are required to align with the direction of approach of a plane, particularly during take-off or landing. By recognizing that the high intensity light only needs to shine in the direction of a runway, the present invention uses a unidirectional or bidirectional high intensity light (rather than an omnidirectional light), resulting in significant power savings. In some embodiments, the opposed banks of high intensity LEDs shown in FIG. 5 may be controlled individually, such that high intensity LEDs are only shined in a single direction.

In the operative state, as shown in FIG. 1, the light housing 120 is oriented substantially vertically, with the high intensity lighting arrangement directed horizontally in opposite directions from the body 110. These directions can be aligned with the direction of a runway.

In the transport state, as shown in FIGS. 2 to 4, the light housing is folded down substantially horizontally, so that it aligns with the profile of the battery housing 130. This means that the light 100 is more compact, and can be more easily transported.

The battery may be used as a primary power source in some embodiments of the present invention. However, in this preferred embodiment, the primary power source is an AC power source, and power cables can be run between aligned lights 100 to properly light a runway. The battery, therefore, acts as a backup power source. This is particularly important for temporary airfields, which frequently do not have a backup power generator.

The light 100 also includes an antenna 140, for receiving wireless control signals. The antenna 140 can also be folded down for transport or when not in use, as best shown in FIG. 2, to reduce the likelihood of damage.

However, although the antenna 140 can be used to receive wireless control signals, control signals may be transmitted through communication cables. This avoids or reduces any interference with wireless communications between the plane and a control tower. Accordingly, cables between lights 100, arranged on an airfield, may also include communication wiring to enable wired communication between the lights 100 and a controller.

Control signals may be used to adjust settings of the light 100. Control settings may vary between different embodiments of the invention, but may include the following functionality:

switching the medium intensity LED 150 on or off;
switching either or both banks of high intensity LEDs 160 on or off;
identifying a pattern or sequence of lighting configurations for the high intensity lights 160 or medium intensity light 150—e.g. a flashing sequence.

Although one embodiment of the present inventive has been described above, the invention is capable of many variations within the scope of the inventive concept. In particular, although the described embodiment makes use of LEDs, other lighting sources may also be used. For example, a halogen light source may be used and still obtain some of the benefits of the present invention.

In other embodiments, the light 100 may not need to be movable to a transport state, or may be moved in a different manner (for example, the light may be moved between operative and transport states by a sliding or telescoping mechanism).

Throughout this specification and the claims which follow, unless the context requires otherwise, the word "comprise", and variations such as "comprises" and "comprising", will be understood to imply the inclusion of a stated integer or step or group of integers or steps, but not the exclusion of any other integer or step or group of integers or steps.

The reference in this specification to any prior publication (or information derived from it), or to any matter which is known is not, and should not be taken as an acknowledgment or admission or any form of suggestion that that prior publication (or information derived from it) or known matter forms part of the common general knowledge in the field of endeavour to which this specification relates.

What is claimed is:

1. An airfield light comprising:
   a body;
   a first lighting arrangement as a first medium intensity airfield lighting arrangement having a first intensity; and
   a second lighting arrangement as a first high intensity airfield lighting arrangement having a second intensity that is more than 1% higher than the first intensity wherein the second lighting arrangement is a unidirectional or bidirectional lighting arrangement wherein a body includes a light housing that comprises opposed first and second open sides, and the second lighting arrangement is configured to direct light out of the first open side, and a third lighting arrangement is configured to direct light out of the second open side.

2. The airfield light according to claim 1 wherein the third lighting arrangement is a second high intensity airfield lighting arrangement of substantially the same intensity as the second lighting arrangement, oriented in a substantially opposite direction.

3. The airfield light according to claim 1, wherein the first intensity is approximately 125 candela.

4. The airfield light according to claim 1, wherein the first medium intensity airfield lighting arrangement is an omnidirectional lighting arrangement.

5. The airfield light according to claim 1, wherein the second intensity is approximately 10000 candela.

6. The airfield light according to claim 1 wherein the third lighting arrangement is a second high intensity airfield lighting arrangement, oriented in a substantially opposite direction, wherein a first setting of the airfield light comprises selectively turning on one of the first lighting arrangement or the second lighting arrangement or the third lighting arrangement.

7. The airfield light according to claim 1, wherein a first setting of the airfield light comprises a pattern of turning on and off one of the first lighting arrangement or the second or third lighting arrangement.

8. The airfield light according to claim 1, wherein the opening of the light housing permits reflection from the cone reflector, omnidirectionally.

9. The airfield light according to claim 1, wherein the body includes a light housing that is movable between an operative state and a transport state.

10. An airfield light comprising:
    a body;
    a first lighting arrangement as a first medium intensity airfield lighting arrangement having a first intensity; and
    a second lighting arrangement as a first high intensity airfield lighting arrangement having a second intensity that is more than 1% higher than the first intensity wherein the second lighting arrangement is a unidirectional or bidirectional lighting arrangement wherein the body includes a light housing that is pivotable to move between an operative state and a transport state.

11. An airfield light comprising:
    a body;
    a first lighting arrangement as a first medium intensity airfield lighting arrangement having a first intensity; and
    a second lighting arrangement as a first high intensity airfield lighting arrangement having a second intensity that is more than 1% higher than the first intensity wherein the second lighting arrangement is a unidirectional or bidirectional lighting arrangement, wherein the body includes a light housing that comprises a cone reflector, and the light housing comprises an opening permitting reflection of the first lighting arrangement from the cone reflector.

12. The airfield light according to claim 11 wherein a setting of the airfield light comprises selectively turning on the first medium intensity airfield lighting arrangement having a first intensity and selectively turning on the first high intensity airfield lighting arrangement in sequence.

13. The airfield light according to claim 11 comprising:
    a third lighting arrangement as a second high intensity airfield lighting arrangement of substantially the same intensity as the second lighting arrangement, oriented in a substantially opposite direction, wherein a first setting of the airfield light comprises selectively turning on the first lighting arrangement but not the second or third lighting arrangement.

14. The airfield according to claim 11 comprising:
    a third lighting arrangement as a second high intensity airfield lighting arrangement, oriented in a substantially opposite direction, wherein a first setting of the airfield light comprises selectively turning on the first lighting arrangement but not the second or third lighting arrangement and wherein a second setting of the airfield light comprises selectively turning on the second lighting arrangement but not the first or third lighting arrangement.

15. The airfield light according to claim 11 wherein a first setting of the airfield light comprises selectively turning on the first lighting arrangement but not the second lighting arrangement and wherein a second setting of the airfield light comprises selectively turning on the second lighting arrangement but not the first lighting arrangement.

16. The airfield light according to claim 11, further comprising an AC power input configured to operate as a first power source and a battery as a backup power source to provide backup power if the first power source is unavailable.

17. The airfield light according to claim 10 wherein a setting of the airfield light comprises selectively turning on the first medium intensity airfield lighting arrangement having a first intensity and selectively turning on the first high intensity airfield lighting arrangement in sequence.

18. The airfield light according to claim 10 comprising:
    a third lighting arrangement as a second high intensity airfield lighting arrangement of substantially the same intensity as the second lighting arrangement, oriented in a substantially opposite direction, wherein a first setting of the airfield light comprises selectively turning on the first lighting arrangement but not the second or third lighting arrangement.

19. The airfield according to claim 10 comprising:
    a third lighting arrangement as a second high intensity airfield lighting arrangement, oriented in a substantially opposite direction, wherein a first setting of the airfield light comprises selectively turning on the first lighting arrangement but not the second or third lighting arrangement and wherein a second setting of the airfield light comprises selectively turning on the second lighting arrangement but not the first or third lighting arrangement.

20. The airfield light according to claim 10 wherein a first setting of the airfield light comprises selectively turning on the first lighting arrangement but not the second lighting arrangement and wherein a second setting of the airfield light comprises selectively turning on the second lighting arrangement but not the first lighting arrangement.

\* \* \* \* \*